United States Patent

Kotecha et al.

(10) Patent No.: US 7,996,812 B2
(45) Date of Patent: Aug. 9, 2011

(54) METHOD OF MINIMIZING EARLY-MODE VIOLATIONS CAUSING MINIMUM IMPACT TO A CHIP DESIGN

(75) Inventors: Pooja M. Kotecha, Beacon, NY (US); Frank J. Musante, Poughkeepsie, NY (US); Veena S. Pureswaran, Raleigh, NC (US); Louise H. Trevillyan, Katonah, NY (US); Paul G. Villarrubia, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/191,435

(22) Filed: Aug. 14, 2008

(65) Prior Publication Data

US 2010/0042955 A1 Feb. 18, 2010

(51) Int. Cl.
 *G06F 9/455* (2006.01)
 *G06F 17/50* (2006.01)
(52) U.S. Cl. ........ 716/134; 716/106; 716/107; 716/108; 716/111; 716/113; 716/114
(58) Field of Classification Search .......... 716/106–108, 716/111, 113, 114, 132, 134
 See application file for complete search history.

(56) References Cited

U.S. PATENT DOCUMENTS

| | | | |
|---|---|---|---|
| 5,218,551 A | 6/1993 | Agrawal et al. | |
| 5,259,006 A | 11/1993 | Price et al. | |
| 5,471,159 A | 11/1995 | Stuebing et al. | |
| 5,764,528 A | 6/1998 | Nakamura | |
| 5,825,661 A | 10/1998 | Drumm | |
| 6,427,226 B1 * | 7/2002 | Mallick et al. | 716/113 |
| 6,546,531 B1 | 4/2003 | Quach et al. | |
| 6,578,175 B1 | 6/2003 | Benevit et al. | |
| 6,591,407 B1 * | 7/2003 | Kaufman et al. | 716/114 |
| 6,698,005 B2 | 2/2004 | Lindkvist | |
| 6,871,336 B1 | 3/2005 | Anderson | |
| 6,895,540 B2 | 5/2005 | Chen et al. | |
| 7,036,104 B1 | 4/2006 | Alpert et al. | |
| 7,111,268 B1 | 9/2006 | Anderson et al. | |
| 7,178,118 B2 | 2/2007 | Ramachandran et al. | |
| 7,222,311 B2 * | 5/2007 | Kaufman et al. | 716/113 |
| 7,549,137 B2 * | 6/2009 | Alpert et al. | 716/114 |
| 2001/0007144 A1 | 7/2001 | Terazawa | |
| 2005/0268263 A1 | 12/2005 | Sun et al. | |

OTHER PUBLICATIONS

Chowdury, S. and Lillis, J, "Repeater insertion for concurrent setup and hold time violations with power-delay trade-off", ISPD 2007.

* cited by examiner

*Primary Examiner* — Nghia M Doan
(74) *Attorney, Agent, or Firm* — H. Daniel Schnurmann

(57) ABSTRACT

A system and a method for correcting early-mode timing violations that operate across the process space of a circuit design. Optimizations are performed to replace padding that increase path delays on fast paths. At the stage in the design process where early-mode violations are addressed, placement, late-mode timing closure, routing, and detailed electrical and timing analysis are assumed to have been completed. The optimizations are designed to be effective in delaying fast paths while minimizing the impact on already-completed work on the chip, in contrast to relying only on adding pads that can have a negative impact on all of these quantities. The optimizations are classified according to their invasiveness and are followed by their deployment. The deployment is designed to minimize using delay pads, reduce design disruptions, and minimize effects on other aspects of the design.

18 Claims, 6 Drawing Sheets

A) EXACT PLACEMENT: CAN ADD A CELL OF SIZE 2 INTO TWO ADJACENT FREE SLOTS x-y

B) EXACT PLACEMENT WITH MOVES: CAN ADD A CELL OF SIZE 3 BY SLIDING B RIGHT ONE UNIT TO GET THREE ADJACENT FREE SLOTS x-y-z

METHOD OF MINIMIZING EARLY-MODE VIOLATIONS CAUSING MINIMUM IMPACT TO A CHIP DESIGN

FIELD OF THE INVENTION

The invention generally relates to the field of automating the design of very large scale integrated circuit (VLSI) chips, and more particularly, to a system and a method for improving the timing by detecting and correcting early-mode timing violations in the electronic circuits while minimizing disruptions to other design characteristics.

BACKGROUND OF THE INVENTION

Traditionally, early mode violations in electronic circuit designs are corrected late in a design cycle. Correcting early mode violations has become a challenging problem in newer technologies. The most common solution to the fixing early-mode violations is to insert delay cells or pads along the fast paths to slow them down. When chips become larger with a corresponding increase in density, as guard-banding due to variations becomes more significant, and as clock domains and skew increases, the number of pads that require handling hold violations becomes unmanageable. The added padding, however, degrades the quality of the design with respect to area, power and routability.

Electronic designs must meet a host of constraints affecting the chip timing. Loosely speaking, timing requirements can be divided into late-mode and early-mode tests. For the late mode, some logic paths may be too slow and as a result, the expected value becomes available one cycle too late. A late-mode analysis is performed under the assumptions that clock signals are running fast and the data signals are running slow. For the early mode, the situation is reversed: paths are too fast, signals are available a cycle too early. The assumptions that are generally made include clock signals running at a slower rate while the data signals are too fast. Early-mode violations are also called "fast paths", "short paths" or "hold violations". It is possible for a single pin to have both early and late-mode timing violations.

As required by timing optimization, it is necessary to perform static timing analysis on a design to find the early and late slacks and directing the optimization to areas that have hold the violations. The method of selecting the most significant violation is generally achieved by creating a list of the violations ordered according to their severity, followed by a second order sort based on non-negative setup slack.

Static timing analysis (STA) algorithms operate by first levelizing the logic structure and breaking any loops in order to create a directed acyclic graph (timing graph). Each delay edge of the timing graph has a source node and sink node, and the sources of a node are the source nodes of its in-edges, while the sinks of a node are the sink nodes of their out-edges. Typically, a timing graph node is associated with each cell input and output pin, and delay edges associated with net source to sink connections and with input to output paths in cells through which signal transitions propagate. Modern designs can often contain millions of placeable objects, with corresponding timing graphs having millions, if not tens of millions of nodes. For each node, a corresponding arrival time, transition rate (slew), and required arrival time may be computed for both rising and falling transitions as well as for both early and late mode analyses.

An arrival time (AT) represents the latest or earliest time at which a signal can transition due to the entire upstream fan-in cone. The slew value is the transition time (e.g., the time it takes the signal to transition from 10% of its final voltage to 90% of its final voltage) associated with a corresponding AT. And a required arrival time (RAT) represents the latest or earliest time at which a signal must transition due to timing constraints in the entire downstream fan-out cone. AT's are propagated forward in a levelized manner, starting from the chip primary input asserted (i.e., user-specified) arrival times, and ending at either primary output ports or intermediate storage elements. AT level numbers are integers assigned such that the AT level of a node is one greater than the largest AT level of any of its source nodes, or zero if it has no source nodes, and thus, the AT level of a node is the maximum number of delay edges between that node and any primary input of the design. For single fan-in cases, AT sink node=AT source node+delay from source to sink.

Whenever multiple signals merge, each fan-in contributes a potential arrival time computed as AT sink (potential)=AT source+delay.

Then, the maximum (late mode) or minimum (early mode) of all potential arrival times is retained. RATs are computed in a backward levelized manner starting from either asserted required arrival times at chip primary output pins, or from tests (e.g., setup or hold constraints) at internal storage devices. RAT level numbers are integers assigned such that the RAT level of a node is one greater than the largest RAT level of any of its sink nodes, or zero if it has no sink nodes, and thus the RAT level of a node is the maximum number of delay edges between that node and any primary output or timing constraint (setup or hold test) of the design. For single fan-out cases, RAT source node=RAT sink node−delay.

When multiple fan-outs merge (or a test is present), each fan-out (or test) contributes a prospective RAT, and then minimum (late mode) or maximum (early mode) required arrival time is retained. The difference between the arrival time and required arrival time (RAT−AT) in late mode, and (AT−RAT) in early mode, is referred to as slack. A positive slack implies that the current arrival time at a given node meets all downstream timing constraints, and a negative slack implies that the arrival time fails at least one such downstream timing constraint.

A single set of setup and hold tests for a node is normally not robust enough to ensure that chip timing achieves zero slack at a variety of different process and operating points.

Corner-based static timing has long been the bedrock technology for timing verification of integrated circuits. Timing of integrated circuits may vary due to processing variations. A corner refers to a set of process parameters/conditions (hereinafter "parameter") that cause variations in the static timing. Processing variations can be classified into two groups: global variations and local variations. Conventionally, global variations, also referred to as chip-to-chip variations, are accommodated by a multi-corner timing. Specifically, each global variation is set to its three-standard deviation (3 sigma) extreme corners, one corner providing the fastest signal propagating checked in the fast chip timing analysis and another corner providing the slowest signal propagation checked in the slow chip timing analysis. Local variations, also referred to as on-chip variations, are modeled by creating a timing skew by making early path latency earlier and late path latency later. This is referred to as an early/late split. The early/late split is often introduced by "derating coefficients", a set that derates the early and late timing.

A common solution to eliminating early-mode violations is by inserting delay cells or pads along the fast paths to slow them down. As chips become larger and denser, guardbanding due to variations increases together with the clock domains and skew, the number of pads that needs to be inserted increases, even though padding can degrade the quality of the design with respect to area, power and routability.

The general approach to handling early-mode violations is to work with a design that is nearly complete, that is, a design that has already been optimized for late-mode violations and electrical correctness, which has been placed and routed, and where a detailed electrical analysis, such as SPICE, has been completed. In this context, optimizations that correct early-mode violations must do so while preserving as much of the original design as possible. More specifically, such optimizations must not introduce a late-mode timing or electrical violation, nor are they to disturb the placement and routing more than necessary. Since many analysis functions cannot be updated incrementally, it is desirable to change the design in a way that does not invalidate such analyses.

Early-mode optimizations must operate in a highly-complex timing environment comprising multiple timing corners as well as early and late modes. (Timing corners define multiple environments in which a chip must operate, for example, at varying voltages or temperatures). The optimizations must be particularly robust and sensitive to these kinds of variations when evaluating the timing.

The problem of correcting early-mode violations is well known. A preferred method of correcting such violations is to insert delay cells (sometimes called "pads") on the fast paths. The extra delay due to the pads can slow down a path sufficiently so that it is no longer too early. The process of adding pads is referred to as "early mode padding".

Many publications focus on finding the optimal place to pad the paths, the optimal number of pads, and/or the optimal strength of pads to be inserted. Examples thereof include, for instance, work by T. Terrazzawa, "Hold Violation Improvement Method; Semiconductor Integrated Circuit and Program for Executing Hold Violation Improvement Method by Computer", U.S. Patent Publication No. 2001/0007144; by Yigan Sun et. al, titled "Method and Apparatus for Fixing Hold-time Violations in a Circuit Design" in U.S. Patent Publication No. 2005/0268263; and by Chowder, S. et al., in a paper "Repeater insertion for concurrent setup and hold time violations with power-delay trade-off", published in the Proceedings of ISPD, 2007.

An inherent difficulty when using pads to correct hold violations is that the pads consume both space on the chip image and power, and generally makes wiring the design more difficult. As long as hold violations were relatively rare, this was an acceptable trade-off. However, in current and future design environments, hold violations are more numerous as a result of the increasing number of clock domains, increased guard-banding related to process variation, and increased clock skew related to large chip sizes. In addition, more exacting power constraints and more dense use of silicon make the insertion of many thousands of delay pads problematic.

Moreover, this problem is compounded as a result of continuously advancing technologies. Area and power constraints make the reliance on only traditional padding techniques problematic. Because early-mode correction is done very late in the design, it is desirable to correct early-mode violations while causing minimum disruptions to other aspects of the design.

Therefore, there is a need for a method for correcting the aforementioned problems while achieving the goal of minimum design perturbation. Of particular importance is to create a new class of optimization of hold violations and a strategy for using them to encourage minimum design changes.

OBJECTS AND SUMMARY OF THE INVENTION

Accordingly, it is an object of the present invention to provide a system and a method for correcting early-mode timing violations in chip circuit design while minimizing disruptions to other design characteristics.

It is still another object to provide a system and method to determine the earliest and latest slack of all available analysis modes at a given timing point, and simultaneously optimizing all analyses modes.

It is a further object to optimize the timing by correcting the early-mode violations without padding fast paths to slow them down by increasing the path delay of the fast paths, and for performing the optimizations while reducing the design impact.

It is yet another object to provide a system and method in which at a predetermined phase of the design process, the early-mode violations are handled following the chip placement and wiring, late-mode timing closure, routing, and electrical and timing analyses.

It is a still a further object to provide a system and method that optimizes the design by effectively delaying the fast paths, while minimizing the impact on already completed work on the chip.

In one aspect of the invention, a new class of optimizations for correcting of early-mode timing violations in electronic circuits is described, together with a method of deployment which achieves minimizing the use of delay pads and avoiding design disruptions.

In another aspect of the invention, there is provided a method and a system for correcting early-mode timing violations in a chip design formed by a plurality of interconnected nets and cells, the chip design having undergone placement, late-mode timing closure, routing, electrical and timing analysis, the method including: selecting at least one of the interconnected nets and cells of the chip design having an early mode slack that is smaller than a predetermined threshold; and performing on at least one of the interconnected nets and cells at least one local optimization other than early mode padding, the local optimization improving the early mode slack.

BRIEF DESCRIPTION OF THE DRAWINGS

The novel features believed characteristic of the invention are set forth in the appended claims. The invention itself, however, as well as a preferred mode of use, further objects aspects and advantages thereof will be best understood by reference to the following detailed description of an illustrative embodiment when read in conjunction with the accompanying drawings, where:

DETAILED DESCRIPTION

The accompanying drawings, which are incorporated herein and which constitute part of the specification, illustrate the presently preferred embodiments of the invention which, together with the general description given above and the detailed description of the preferred embodiments given below serve to explain the principles of the invention.

Figure 1:
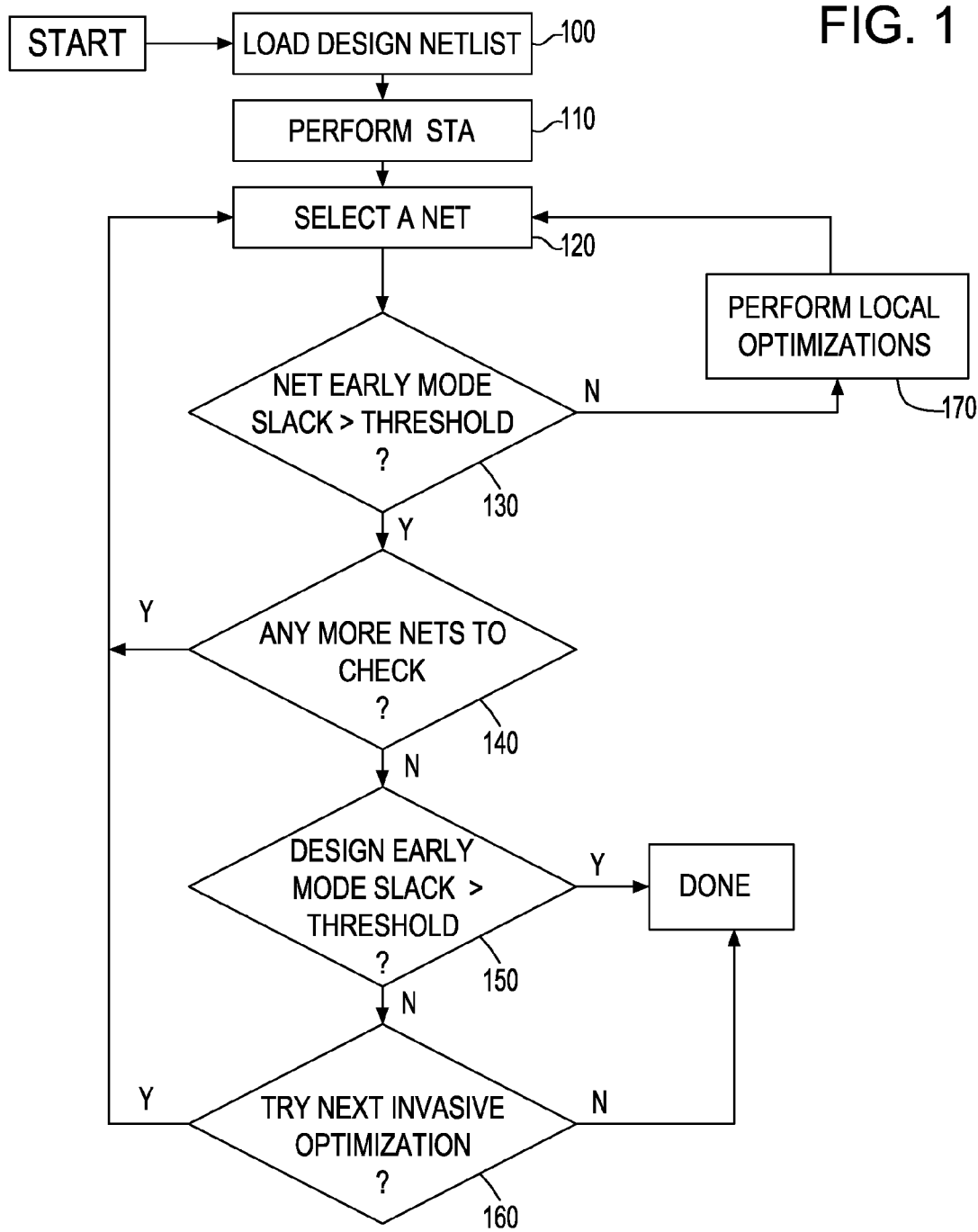
FIG. 1 is a flowchart illustrating a timing closure process according to an embodiment of the present invention.

Referring now to FIG. 1, in one embodiment of the invention, the design optimization or correction process starts by loading a design netlist, step 100. A conventional static timing analysis (STA) is then performed in step 110 using estimated net capacitances or extracted detailed parasitics. In step 120, an iterative process is initiated, checking and correcting nets by selecting a first net on which to operate. The selection may be done by choosing, one by one, all nets of the design, or by restricting the process to nets having a slack that is less than a predetermined threshold. As local optimizations are performed in step 150, as will be described later, successive executions of the net selection step 120 may also preferably repeat the election of previously selected nets to verify that the changes did not cause a previously checked net to become problematic. Because of the nature of the optimizations performed, however, this will generally not be required, as the optimizations only reduce or eliminate a hold violation without introducing new fails (setup or hold).

Step 130 performs a check to see if the net has an early mode slack that is less than the early mode slack threshold. If the net is less than the threshold, the process branches to step 170 for correction. If the net does not have a violation, the program proceeds to step 140, continuing to check for other nets requiring optimization.

Step 150 is invoked when step 140 detects that no other nets remain that have not yet been optimized. At step 150, the worst early mode slack of the entire design is computed. If this slack is less than the early mode slack threshold, then additional optimization is required.

Figure 2:
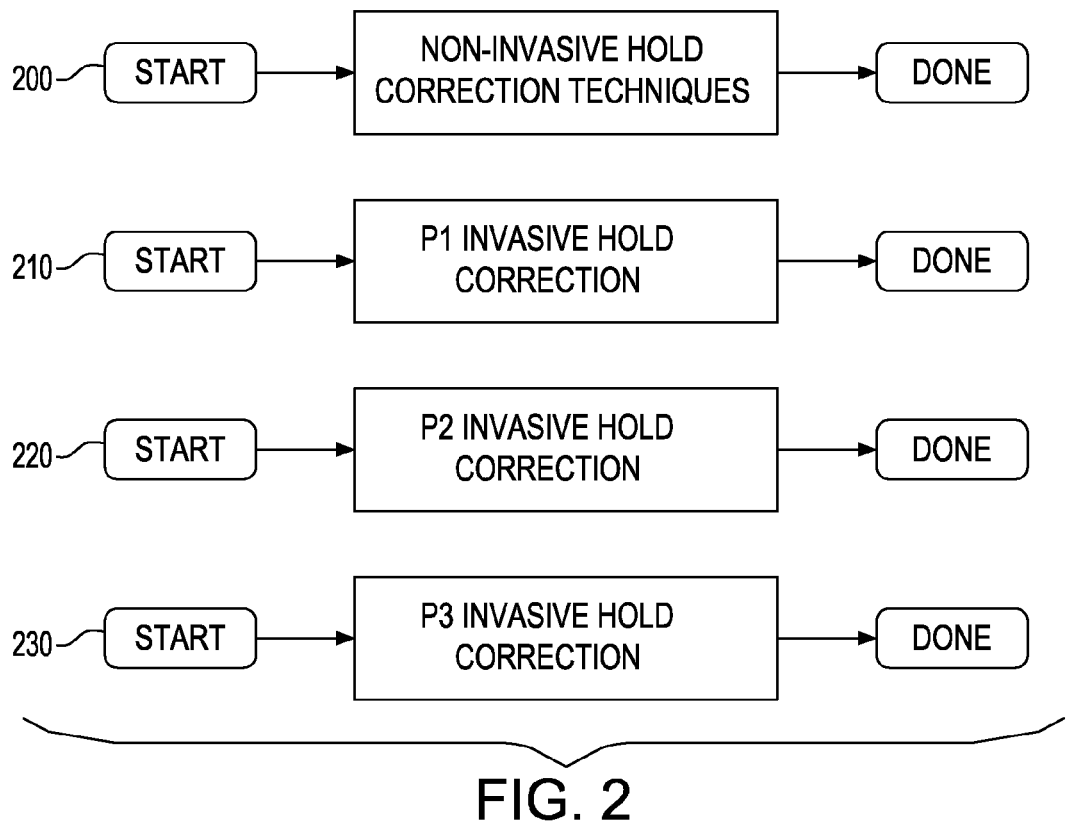
FIG. 2 is a flowchart illustrating the application of placement non-invasive transforms, referred to as P1, P2 and P3 placement invasive transforms.

Step 160 verifies whether more invasive optimizations have not yet been applied (step 170). It is at this step where the next level of invasive transforms is allowed to be applied to the netlist. A list of the increasingly invasive transforms is shown in FIG. 2. If the most invasive transform was already applied to the design or if no hold additional violations remain, then the program stops.

Step 170 constitutes the core of the early mode optimization. Any optimization at this stage depends on previous optimizations that were already applied when reaching step 160. FIG. 2 is an expanded version of this step and highlights each of the possible optimizations that were already applied. This step may either be executed starting with the least invasive optimization (step 200), followed by the next most invasive optimization (step 210), the third most invasive optimization (step 220), or alternatively, with the most invasive optimization (step 230). A full description of the transforms and what constitutes invasiveness is described hereinafter.

The optimizations applied query the earliest slack of all analysis modes and the latest slack of all analysis modes to guarantee that a change in one process corner does not negatively affect another process corner.

In one embodiment of the invention, the method is divided into two sections: firstly, classifying optimizations by their invasiveness, and secondly, deploying the optimizations to achieve a minimum perturbation.

An ordered list of optimizations is provided hereinafter for the purpose of illustrating their deployment.

New Optimizations

A minimally invasive optimization is defined as one increasing the path delay without adding pads. Broadly speaking, they increase path delay on either the delay on existing cells or the wire delay that normally augments the capacitive load on the wire. These types of optimizations are not only effective in increasing the short-path delay, but they often have beneficial side effects, such as reducing power or area. The methods vary in their impact on the design. As will be explained hereinafter in the deployment section, the ordering of these optimizations is crucial to the effectiveness of the method.

Figure 7:
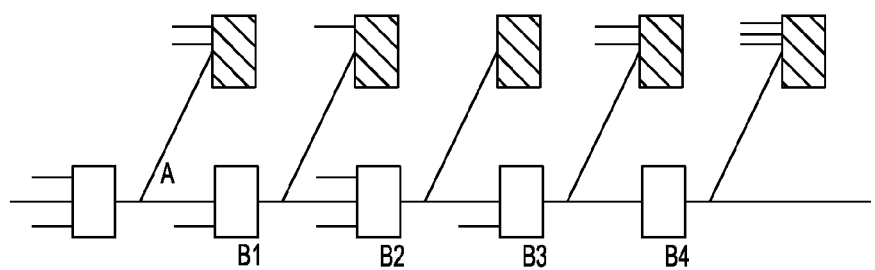
FIG. 7 illustrates a technique of repowering side paths to repair a hold violation.
Figure 8:
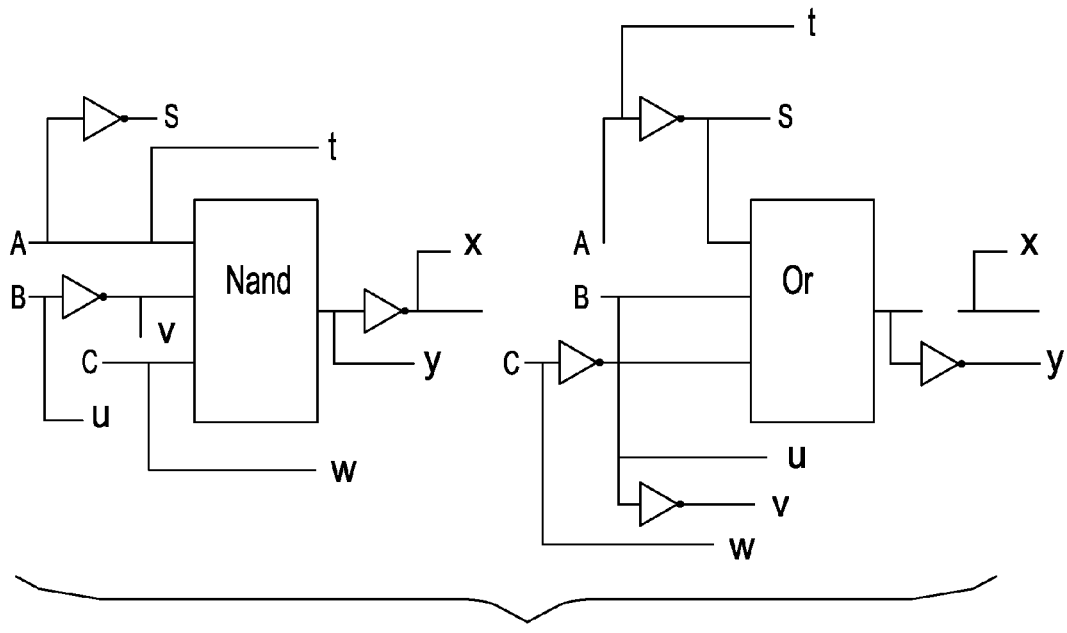
FIG. 8 illustrates a technique of restructuring the logic to repair a hold violation.

Examples of such optimizations include: pin swapping cells (FIG. 3), use of existing equivalent-value nets (FIG. 4), buffer removal (FIG. 5), net-segment demotion (FIG. 6), resizing of side-path cells (FIG. 7), and recovering, i.e., using a different arrangement of functionally equivalent cells (FIG. 8). None of these optimizations are performed, if by doing so they cause a violation of previously optimized constraints, such as electrical correctness or late-mode timing.

Figure 3:
FIG. 3 illustrates an instance of pin swapping addressing an early-mode hold violation.

O1. Pin Swapping:

In a standard cell library, the delays from the various input pins to the output pin(s) are not identical. FIG. 3 illustrates pin swapping by way of an example in which the delay from input pin A to output pin O is assumed to be considerably faster than the delay from input pin B to the same output. In order to add delay to a path, the order of the connections between commutative inputs to the cell can be changed so that the net with a hold violation moves to the slowest pin, as long as by doing so it does not cause a late-mode or electrical violation on the net or on any other nets that are disturbed by the new connections. The optimization has no effect on placement or power, and only a minimal effect on routing since pins on a cell are always close to one another.

Figure 4:
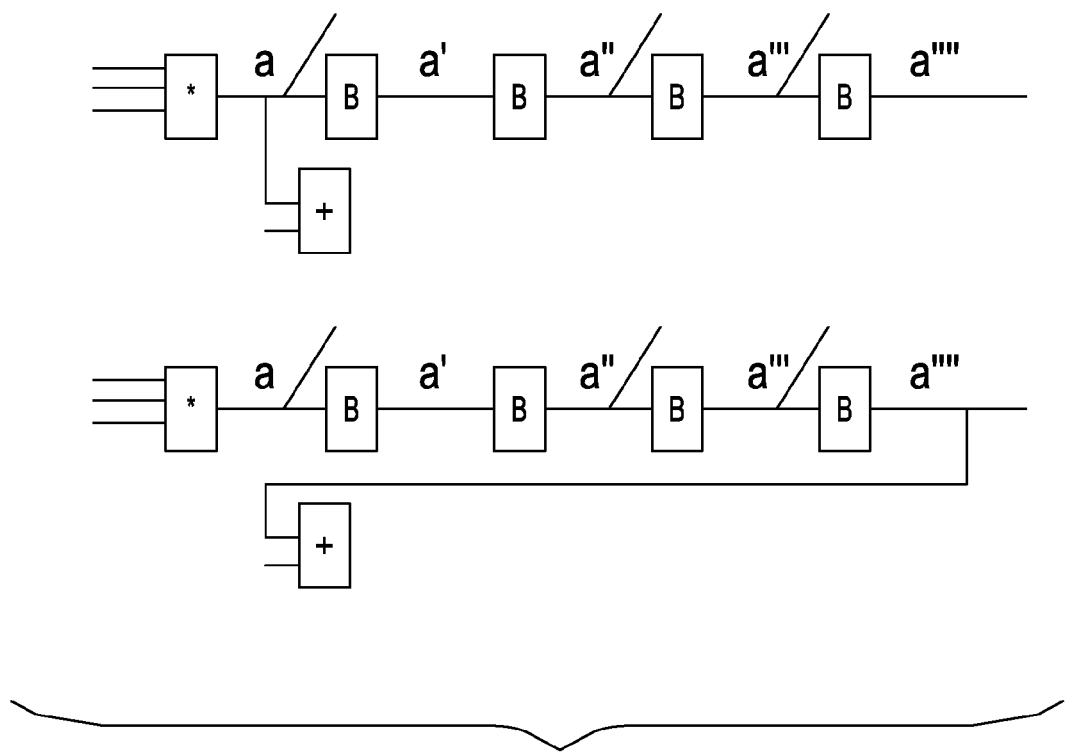
FIG. 4 illustrates the use of equivalent nets to repair a hold violation

O2. Use of Equivalent-Value Nets:

Referring to FIG. 4, there is shown an illustrative example of the equivalent-net exchange. Let it be assumed that a net on pin P of a short path has another net of equivalent value in the design. This can happen because of cloning or buffering done for late-mode timing or electrical correction. If any of the equivalent nets is slower, the existing net can be disconnected from P and a slower net can be connected in its place. This can be done only when early-mode is improved and other constraints are not violated. This optimization changes only wiring, not placement, but makes more dramatic wiring changes than does pin swapping.

Figure 5:
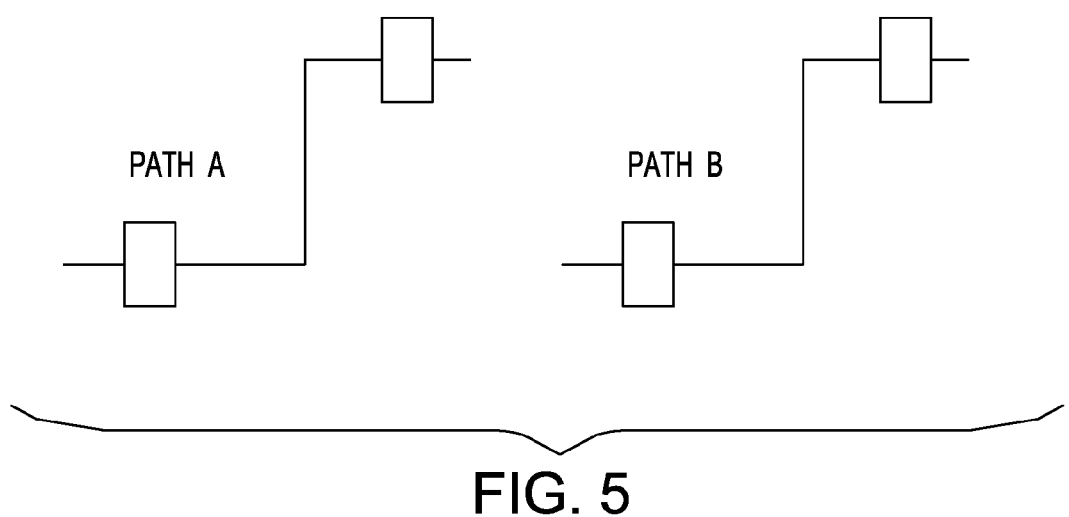
FIG. 5 illustrates a net-segment demotion to increase the delay of a wire.

O3. Buffer Removal:

Referring to FIG. 5, there is shown an illustrative example of how buffer removal may increase path delay. It usually occurs when buffers (or inverter pairs) are added to the design to correct late-mode timing errors or when electrical violations are no longer needed and can be removed. Removing the buffer (or inverters) decreases the block delay but increases the capacitive load on the wire. In this example, buffers (or inverter pairs) B1, B2, B3, and B4 have been removed. Given the wire-delay dominance of current technologies, it can increase the delay on the path. This optimization also reduces area and power consumption, and affects only the wiring but not the placement.

Figure 6:
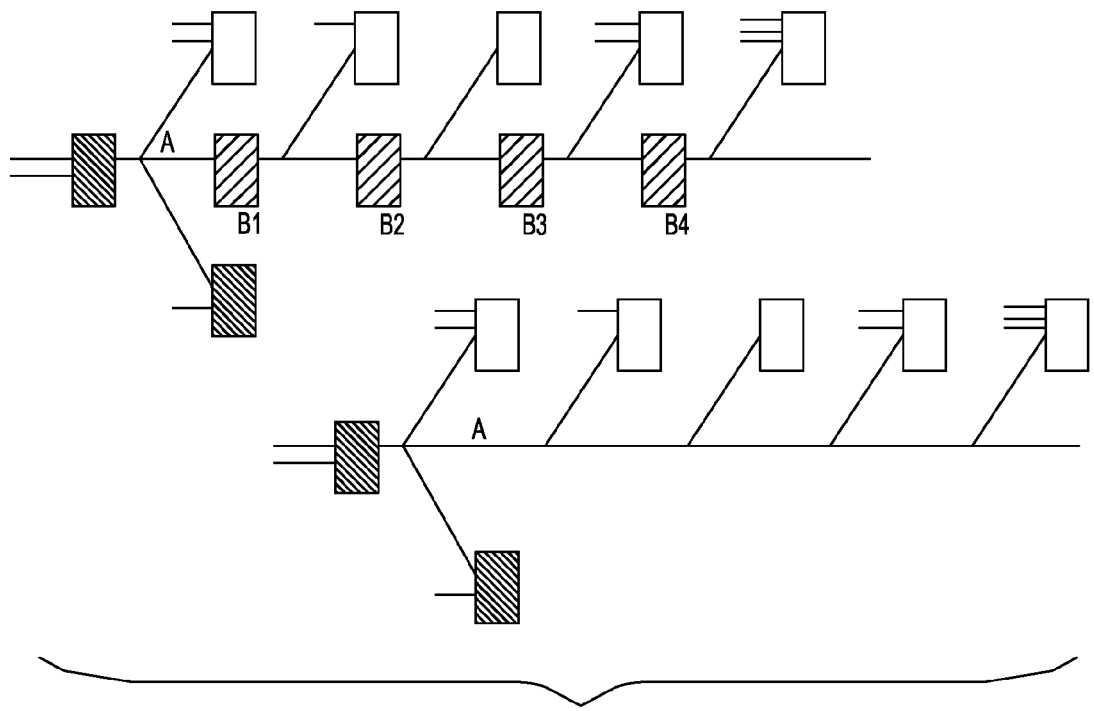
FIG. 6 illustrates how buffer removal slows down a path and repairs a hold violation.

O4. Net Segment Demotion:

Referring to FIG. 6, there is shown an illustrative example of changing wire size. There are several layers available on a chip for routing nets. Generally, layers may have varying timing characteristics, the higher layers are thicker and the nets routed on them are faster, as illustrated by Path A from FIG. 5. To slow down a path, a net or net segment can be demoted from a faster, higher layer to a lower, slower layer; illustrated by Path B from FIG. 5. In many cases, wiring data is not available, which restricts demotion to be on a net basis.

O5. Resizing Side Paths:

Referring to FIG. 7, standard-cell libraries have a variety of choices for implementing a particular cell. They vary in the drive capacity of the cell and in the capacitance presented by input pins. Generally, as the drive capacity increases, the cell becomes faster while input pin capacitance and the cell size increases. The wire delay can be increased by changing the cell used at the sinks of the net on a slow path by varying the sink cells to increase the capacitive load on the net. In practice, because the pins having a higher capacitance are associated with faster cells, the sink cell(s) of the net that are also on slow paths cannot be resized. Generally this is performed on "side sinks" of the net. The optimization may change the placement, as the resized cells may be larger than previous versions. They can be mitigated by restricting the resizing to an equal of lesser image footprint to the original cell that was used. O6. Recovering by way of a Different Arrangement of Functionally Equivalent Cells:

Referring to FIG. 8, the design can be modified to use a different selection of library cells in its implementation. For example, a NOR gate can be changed to an OR gate followed by an inverter, if this slows down the path. There are also compound functions (AO, AOI, OA, OAI, MUX, and the like) stored in a library. The compound cells are usually slower than an equivalent arrangement of single-level Boolean functions (AND, OR, NAND, NOR, NOT), so that path delay can be increased by substituting the use of the compound cells for the single-level implementations. For example, an AOI can sometimes be substituted for an implementation consisting of two two-way NANDs feeding another two-way NAND. The use of compound cells normally saves area, but locally disturbs placement and wiring.

Deployment of the Optimizations:

In line with the goals of minimum disturbance to assure that already-optimized design characteristics are maintained, it is necessary to employ the above optimizations in a complex timing environment. Circuit timing for both early and late mode must be available, and it might be necessary to also use the results of multi-corner timing analysis to ensure correct optimization in a wide variety of environments. The invention does not claim multi-mode or multi-corner timing setup as an invention in this area due to prior work in this area by Chodury et al., previously cited. However, the optimizations must be sensitive to the environment, and a method is required to set up and initialize an appropriate timing environment. The optimization techniques disclosed in one embodiment of the invention are designed to correct hold violations across all the process corners. It is assumed that the work required to set up and initialize an appropriate timing environment has already been performed.

The overall method is to deploy the optimizations in an environment that successively relaxes the constraints on the optimizations and within the environment to order the optimizations from least to more intrusive. It is also desirable to apply the optimizations to the design in such a way as to achieve maximum savings. The method chosen is to visit the cells with early mode violations in the order of maximum early-mode violation and maximum late-mode slack.

The primary condition to minimize design disturbances is a stable placement wherein the wiring generally does not change much. Thus, it is advantageous to ensure minimum disturbance on the placement characteristics of the design.

A placement program assigns chip locations to the cells of the design. It "knows" where each cell is placed and where free space is available in order to add new cells or expand existing ones. Expansion of an existing cell may require a placement change if adjacent space is not available for the expansion.

In the optimization environment, the design has already been placed so that every cell has a legal placement. Changes requiring optimization are performed by incrementally adjusting the placement of the design.

Figure 9:
FIG. 9 illustrates several exact placement techniques used in an embodiment of the present invention.
Figure 9:
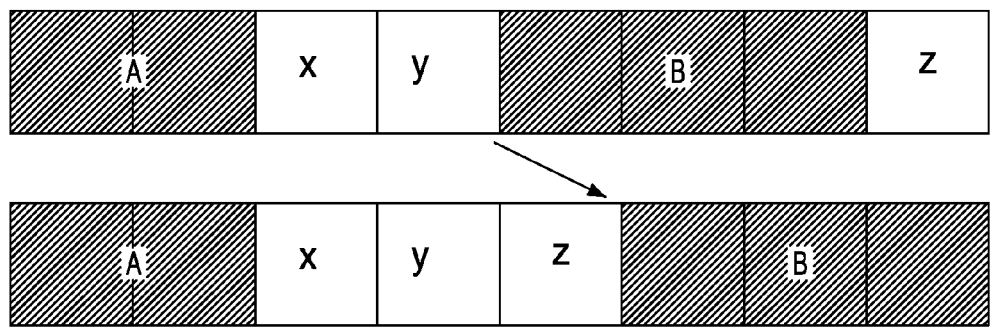

In one embodiment of the present invention, three types of incremental placement are employed:

P1. Exact placement of a cell in existing space within a specified distance. If a new cell is added or an existing cell is enlarged, existing space on the image must be found which will accommodate the area change. FIG. 9A illustrates finding an exact placement solution.

P2. Exact placement within a specified distance with the possibility of short moves to create sufficient area for a new or expanded cell. Somewhat more aggressive than the first option, this allows placement to consolidate free space by sliding existing cells enough to create enough space for the new placement. This will modify placements in the locality of a logic change by a small amount. FIG. 9B illustrates an exact placement with short moves.

P3. Placements allowing overlaps with existing cells. In this case, the optimizations must be followed by a legalization step which resolves any overlap and ensures that all of the cells reside in an allowed location with the correct cell rotation. Legalization may cause more dramatic replacement of cells and can potentially result in some cells moving long distances. The possibility of long moves can be mitigated by dividing the image into a collection of adjacent bins, wherein the amount of free space in each bin is known. An optimization is allowed to increase the used area in the bin as long as the free space in the bin accommodates the increase. The free space may be fragmented, so that there is not enough continuous space for the increase, but it is likely that the effects of legalization will not spread widely beyond the bin. When an optimization uses some of the free space in the bin, the free space count is decremented such that subsequent optimizations see an updated view of the placement resources available. This differs from P2 because it allows a more extensive movement of the cells within the design.

Figure 10:
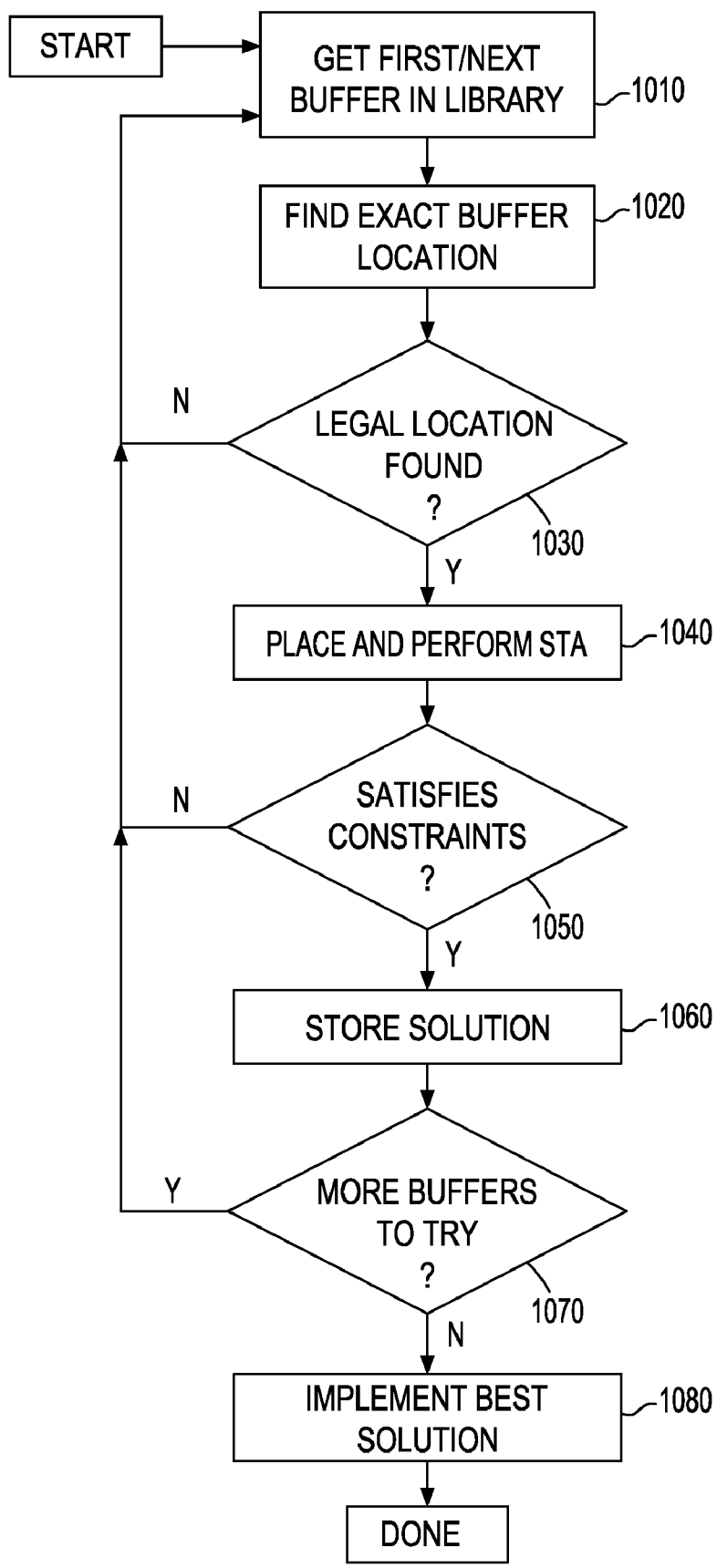
FIG. 10 is a flow chart illustrating a more detailed description of the non-invasive hold correction shown in FIG. 2.

FIG. 10 illustrates the P1 exact placement process. At the start of the optimization, a net with a hold violation is selected. Step 1010 initiates the optimization process by selecting the first buffer from the buffering library. Step 1020 examines the size of the selected buffer and begins searching within the region surrounding the location, given a specified search radius, for a location that can accommodate the device. In step 1030 if a valid location is not found the next smallest buffer in the library is retrieved and the loop is repeated until there are no smaller buffers to try. Step 1040 places the buffer in the chip images and a static timing analysis is performed. Step 1050 verifies that the device satisfies the electrical constraints. If the device does not satisfy the electrical constraints, it is removed from the netlist and the next buffer in the buffer library is retrieved, repeating the process until there are no more buffers to try. Step 1060 stores in memory the devices, location and electrical characteristics of the solution. The device is then removed from the design. Upon finding a valid solution, step 1070 checks repeat the process to determine whether there are any other buffers in the buffer library. Finally in step 1080, the best buffering solution found is incorporated in the design.

The disclosed method of correcting hold violations is a hybrid optimization consisting of four steps, each becoming more aggressive and invasive to the structure of the design than the previous one.

First, the optimizations which have no effect on placement are run. Examples of these are O1 through O4.

Next, the optimizations are ordered from least to most invasive (for example, in the order in which the example methods are given). Padding is added to the list of optimizations as a final option. Optimizations are run in an environment where only P1 placement moves are allowed.

If early-mode violations remain, the same optimizations are run in a P2 placement environment.

Finally, the same optimizations are performed a second time using a P3 placement environment. Legalization is performed between the optimizations or after a predetermined number of moves has been done.

The present invention can be realized in hardware, software, or a combination of hardware and software. The invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the true scope and spirit of the present invention.

What is claimed is:

1. A method of correcting early-mode timing violations in a chip design formed by a plurality of interconnected nets and cells, the chip design having undergone placement, late-mode timing closure, routing, electrical and timing analysis, the method comprising:

a) using a computer, selecting at least one of the plurality of interconnected nets and cells of the chip design having an early mode slack that is smaller than a predetermined threshold; and b) performing on said at least one of the plurality of interconnected nets and cells at least one local optimization without applying early mode padding, wherein changes requiring said local optimization are performed by incrementally adjusting the placement of the chip design, said incrementally adjusted placement comprising:

i. an exact placement in an existing space within a specified distance;

ii. an exact placement in an existing space within a specified distance with moves for creating sufficient area for a new or expanded cell; and iii. a placement allowing overlaps with existing cells.

2. The method according to claim 1 further comprising:

iv.) finding the net and cell having an early mode slack exceeding a predetermined threshold;

v.) applying to said net or cell a least invasive local optimization;

vi.) determining if the slack of said net or cell is smaller than the predetermined threshold, and if the slack is smaller than the predetermined threshold, then applying thereto a subsequent optimization; and vii.) repeating steps v.) and vi.) to subsequent nets or cells until the early mode slack no longer requires further optimization.

3. The method according to claim 2 wherein step v.) is followed by sorting said local optimizations according to predetermined criteria.

4. The method according to claim 2 further comprising deploying said local optimizations by performing said at least one local optimization starting with the least invasive one, followed by increasingly invasive local optimizations in ascending order.

5. The method according to claim 2 wherein said local optimizations do not introduce violations in other domains, said domains including late mode, noise, and electrical perturbations.

6. The method according to claim 2 further comprising a step of correcting hold violations by monotonically increasing levels of aggressiveness of said invasive steps, said step comprising:

a. performing local optimizations not affecting placement;

b. adding first padding to a list of said local optimizations;

c. adding second padding to the list of said local optimizations; and d. adding legalizations between the local optimizations or after a number of moves.

7. The method according to claim 1 wherein performing said at least one local optimization comprises inserting buffers with an exact cell placement, said at least one local optimization locating space within the chip design that can accommodate the cell without moving existing logic.

8. The method according to claim 1 wherein said at least one local optimization comprises pin swapping, wherein logic cells with multiple inputs have at least one commutative pins that can be swapped.

9. The method according to claim 1 wherein said at least one local optimization comprises buffer removal, wherein existing buffers or inverter pairs are removed from said netlist to increase gate load and gate delay.

10. The method according to claim 1 wherein said at least one local optimization comprises net segment demotion that reduces wire widths, increasing wire resistance and adding delay to a path.

11. The method according to claim 1 wherein said at least one local optimization comprises resizing side paths to increase the load of a driving box, induce cell delay and slow a path.

12. The method according to claim 1 wherein said at least one local optimization comprises forming different arrangements of functionally equivalent cells to increase path delay.

13. The method according to claim 1 further comprising:
determining hold timing and setup timing information for each net and cell to detect early mode timing violations.

14. The method according to claim 13, wherein said obtaining said timing information further comprises the timing information applicable to a plurality of operating modes, each operating mode being associated with a respective set of timing constraints.

15. The method according to claim 1 further comprising deployment of said local optimizations to minimize delay pads.

16. The method according to claim 1 further comprising identifying when said local optimization cause a violation to previously optimized constraints, said constraints including electrical correctness or late-mode timing.

17. The method according to claim 1 further comprising performing said local optimizations initially on the cells with early mode violations and maximum late mode slack.

18. A non-transitory program storage device readable by a machine, tangibly embodying a program of instructions executable by the machine to perform method steps for correcting early-mode timing violations in a chip design formed by a plurality of interconnected nets and cells, the chip design having undergone placement, late-mode timing closure, routing, electrical and timing analysis, the method steps comprising:
 using a computer, selecting at least one of the plurality of interconnected nets and cells of the chip design having an early mode slack that is smaller than a predetermined threshold;
 performing on said at least one of the plurality of interconnected nets and cells at least one local optimization other than early mode padding, said at least one local optimization improving the early mode slack; and
 correcting hold violations by monotonically increasing levels of aggressiveness of invasive steps, said correcting hold violations comprising:
 performing local optimizations not affecting placement;
 adding a first padding to a list of said local optimizations;
 adding a second padding to the list of said local optimizations; and
 adding legalizations between the local optimizations or after a number of moves.

* * * * *